(12) United States Patent
Loup et al.

(10) Patent No.: US 6,332,330 B1
(45) Date of Patent: Dec. 25, 2001

(54) DEVICE FOR MOTOR-VEHICLE HEATING AND/OR AIR CONDITIONING WITH IMPROVED BLOWER

(75) Inventors: Didier Loup, Maurepas; Carine Paumier, Versailles; Naji Said; Pascale Petitjean, both of Neauphle le Vieux, all of (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/659,054

(22) Filed: Sep. 11, 2000

(30) Foreign Application Priority Data

Sep. 10, 1999 (FR) .................................................. 99 11371

(51) Int. Cl.[7] ...................................................... B60H 1/32
(52) U.S. Cl. .......................... 62/244; 165/42; 237/12.3 A; 454/144; 454/156
(58) Field of Search ................................. 62/244; 165/42, 165/43; 237/12.3 A; 454/139, 144, 156

(56) References Cited

U.S. PATENT DOCUMENTS 4,913,347   4/1990   Burst et al. .
5,449,321   9/1995   Dauvergne .

Primary Examiner—William E. Tapolcal
Assistant Examiner—Mohammed M. Ali
(74) Attorney, Agent, or Firm—Liniak, Berenato, Longacre & White

(57) ABSTRACT

A heating and/or air conditioning device for a motor-vehicle passenger compartment has an air-inlet chamber and a blower for installation in a rear part of the vehicle, a treatment and distribution device for installation in a front part of the passenger compartment), and a connecting duct for connecting the blower to the treatment and distribution device.

10 Claims, 1 Drawing Sheet

DEVICE FOR MOTOR-VEHICLE HEATING AND/OR AIR CONDITIONING WITH IMPROVED BLOWER

FIELD OF THE INVENTION

The invention relates to a device for heating and/or air conditioning a motor-vehicle passenger compartment.

It relates more particularly to a device comprising an air-inlet chamber suitable for being fed with outside air or with recirculated air, a blower linked to the air-inlet chamber for producing a blown airflow, and treatment and distribution means fed by the blower for producing a treated airflow and distributing it among various vents opening out into the passenger compartment.

DESCRIPTION OF THE PRIOR ART

In the known devices of this type, the air-inlet chamber and the blower are generally arranged in the engine compartment, or in the passenger compartment at the front, while the treatment and distribution means are generally housed in the passenger compartment and under the dashboard. This makes it necessary to provide an aperture in the bulkhead which separates the engine compartment from the passenger compartment, so as to feed the treatment and distribution means with the airflow sent by the blower.

The air-inlet chamber usually comprises an outside-air inlet which is fed from an air intake generally situated at the base of the windscreen, and a recirculated-air inlet provided at the front of the passenger compartment. These two air inlets are controlled by a pivoting flap possessing two extreme positions and possibly at least one intermediate position.

Because the whole of the device, and especially the blower, is placed at the front of the vehicle, various drawbacks result therefrom.

First of all the aperture formed in the bulkhead lets through the noise from the engine and reduces the rigidity of the structure of the vehicle.

Moreover, these known devices are relatively bulky and consequently take up a significant amount of space under the dashboard. Moreover, the noise generated by the blower is transmitted directly to the driver and to the passengers with practically no filtering.

In the recirculated-air operating mode, the distribution of the air takes place in a loop under the dashboard, so that the passengers seated in the rear get practically no benefit from this air distribution.

Furthermore, the management of the regulation is heavily dependent on the dynamics of the vehicle and generally requires an air-throughput flap.

Moreover, it is generally difficult to remove the blower, which does not allow for easy maintenance. Finally, in a partial-recirculation position, it is practically impossible to have outside hot air or cold air in the region of the passengers' feet, for certain operating modes.

The object of the invention is especially to overcome the abovementioned drawbacks.

SUMMARY OF THE INVENTION

According to the present invention there is provided a device for heating and/or air conditioning a motor-vehicle passenger compartment, comprising an air-inlet chamber suitable for being fed with outside air or with recirculated air, a blower linked to the air-inlet chamber for producing a blown airflow, treatment and distribution means fed by the blower for producing a treated airflow and distributing it among various vents opening out into the passenger compartment, wherein the air-inlet chamber and the blower are adapted for being installed in a rear part of the vehicle, while the treatment and distribution means are adapted for being installed in a front part of the passenger compartment and wherein a connecting duct is provided for connecting the blower to the treatment and distribution means.

Thus, the blower is shifted towards the rear of the vehicle, for example into the luggage compartment thereof. And the same goes for the air-inlet chamber. This installation in the rear part of the vehicle poses no particular problem. It is sufficient simply to provide an electrical power supply for the blower and an aperture in the rear part, for example in the luggage compartment, communicating under the floor, or in a wing passage, or with the closure of the passenger compartment or of the tailgate.

The air-inlet chamber is then placed at an appropriate place at the rear of the vehicle.

The connecting duct makes it possible to link the blower to the treatment and distribution means, which makes it possible to filter the noise generated by the blower.

Because of the rear installation of the blower, the vibration from the motor thereof is no longer transmitted to the front, and especially to the steering column.

A further result is improved air-supply comfort, especially in the recirculated-air position, because of the fact that this recirculated air circulates between the front and the rear of the passenger compartment.

According to another characteristic of the invention, the air-inlet chamber is equipped with an inlet for outside air which communicates with the outside of the passenger compartment, with an inlet for recirculated air which communicates with the interior of the passenger compartment and with at least one flap suitable for being brought selectively either into a position called "outside air" in which the air-inlet chamber is supplied with outside air, or into a position called "recirculated air", in which the air-inlet chamber is fed with recirculated air, or into an intermediate position.

The inlet for outside air communicates with an air intake opening out outside the passenger compartment, either downwards, level with the floor, or upwards in the region of a luggage compartment or a tailgate of the vehicle.

The inlet for the recirculated air communicates with the rear part of the vehicle which is advantageously separated from the passenger compartment by a partition fitted with air-passage apertures.

According to yet another characteristic of the invention, the air-inlet chamber and the blower are suitable for being installed in the region of the rear luggage compartment of the vehicle.

Advantageously, the air-inlet chamber further comprises an air extractor suitable for being either open in the "outside air" position, or closed in the "recirculated air" position.

The device of the invention may comprise either a single air blower, or two air blowers.

According to yet another characteristic of the invention, the treatment and distribution means are suitable for being installed in the region of the dashboard of the vehicle, for example under it.

The treatment and distribution means comprise means for heating and/or cooling the airflow supplied by the air blower.

The device may further comprise an additional electric-heating radiator installed at the outlet from the blower or in the connecting duct for pre-heating the air sent to the treatment and distribution means.

This additional electric-heating radiator advantageously comprises at least one electrical resistance element with a positive temperature coefficient.

The device may also comprise one of the filtering means, particularly with a pollen and and/or odor filter.

BRIEF DESCRIPTION OF THE DRAWINGS

In the description which follows, given solely by way of example, reference is made to the attached drawings, in which.

DESCRIPTION OF THE PREFERRED EMBODIMENTS

Figure 1:
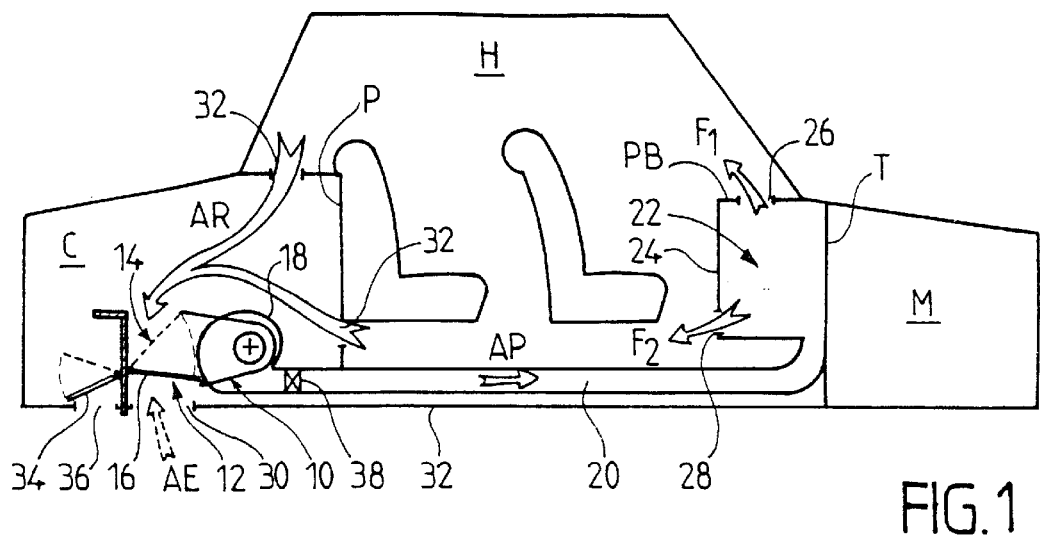
FIG. 1 is a diagrammatic view in longitudinal section of a motor vehicle equipped with a heating and/or air conditioning device according to a first embodiment of the invention.

In the various figures, like reference numerals indicate like parts.

Referring first of all to FIG. 1, a motor vehicle is shown diagrammatically, comprising a passenger compartment H, an engine compartment M separated from the passenger compartment by a bulkhead T and a rear part which, in the rest of the description, will be designated as being the luggage compartment C.

In the present description, the term luggage compartment is intended to designate, in a general way, the compartment reserved for baggage which is provided in a motor vehicle, such as a saloon car equipped with a trunk or with a tailgate, a station wagon, a minivan, etc.

In the exemplary embodiment of FIG. 1, the luggage compartment C is closed by a conventional trunk and is separated from the passenger compartment H by a wall P which also comprises the rear shelf.

The vehicle is equipped with a heating and/or air-conditioning device comprising an air-inlet chamber 10 equipped with two inlets 12 and 14 serving respectively to allow in outside air AE (taken up from outside the passenger compartment of the vehicle) and recirculated air AR (taken up from inside the passenger compartment H). These air inlets 12 and 14 are controlled by a pivoting flap 16 capable of occupying selectively either a position called "outside air" position (represented in dashed line), or a "recirculated air" position (represented in solid line), or possibly at least one intermediate position. In the position represented in FIG. 1, the flap 16 is in the "recirculated air" position and the chamber 10 is therefore fed with a recirculated airflow AR originating from the passenger compartment H.

The air-inlet chamber 10 is housed in the luggage compartment C and it communicates directly with a blower 18, of tangential type, also housed in the luggage compartment C. This blower, in a way which is itself known, possesses an electric motor driving a turbine. The blower 18 is suitable for producing a blown airflow AP, which is sent into a connecting duct 20 which extends longitudinally within the vehicle and which feeds treatment and distribution means 22 housed at the front of the passenger compartment H, behind the bulkhead T and under the dashboard PB.

These means 22 are contained in a casing 24 and are intended to treat the blown airflow so as to cool it and/or heat it by means which are themselves known and will not be described here. These means also comprise distribution flaps and the like, also not described here, for distributing the blown airflow among various vents opening out into the passenger compartment. These vents especially comprise vents 26 formed in the dashboard and opening out in the upper part of the passenger compartment, and vents 28 opening out towards the lower part of the passenger compartment, that is to say towards the passengers' feet.

These vents 26 and 28 thus make it possible to send an airflow F1 towards the upper part of the passenger compartment and an airflow F2 towards the lower part of the passenger compartment respectively. As can be seen in FIG. 1, the casing 24 housing the treatment and distribution means 22 is situated completely in the passenger compartment along the bulkhead T, so that it is no longer necessary to form an aperture through the bulkhead T, as was necessary in the known devices.

The air inlet 12 communicates with an air intake 30 opening out outside the passenger compartment H and which, in this example, is formed through the floor 32 of the vehicle. This air intake may be equipped with an anti-return valve (not represented) in order to avoid underpressure.

The inlet 14 for the recirculated air communicates directly with the luggage compartment C. As this inlet 14 has to be fed with the recirculated air AR originating from the passenger compartment, the wall P is configured to allow this air to pass. This wall, in this example, includes air-passage apertures 32. It is possible to produce the wall with a multiplicity of low-caliber apertures in order to allow better distribution of the recirculated air AR from the passenger compartment H to the luggage compartment C.

The device of FIG. 1 further comprises an air extractor 34 produced in the form of a pivoting flap controlling an aperture 36 formed through the floor 32. This extractor is able to be either open (as represented in dashed line) in the "outside air" position, or closed (represented in solid line) in the "recirculated air" position. For preference, the air extractor 34 can also take up at least one intermediate position, in correspondence with an intermediate position of the pivoting flap 16.

Thus, in the "recirculated air" position, the extractor is closed and the recirculated air AR originating from the passenger compartment H is sucked in by the blower 18 and sent to the treatment and distribution means 22.

In the "outside air" position, the flaps 16 and 34 are in the dashed position represented in FIG. 1. The blower 10 is then fed with a flow of outside air AE taken up from outside the passenger compartment, and this air is sent to the treatment and distribution means 22 then sent into the passenger compartment. Next, this outside air reaches the luggage compartment and is discharged outwards via the extractor 34 which is in open position.

In a variant embodiment (not represented), the pivoting flap 16 and the air extractor 34 may jointly form a single-piece flap, in particular of the butterfly type.

As shown in FIG. 1, the device further comprises an additional electric-heating radiator 38 installed at the outlet from the blower 18 or in the connecting duct 20 so as to pre-heat the air sent to the treatment and distribution means 22. This electric radiator advantageously comprises at least one electric heating element with a positive temperature coefficient (PTC).

Figure 2:
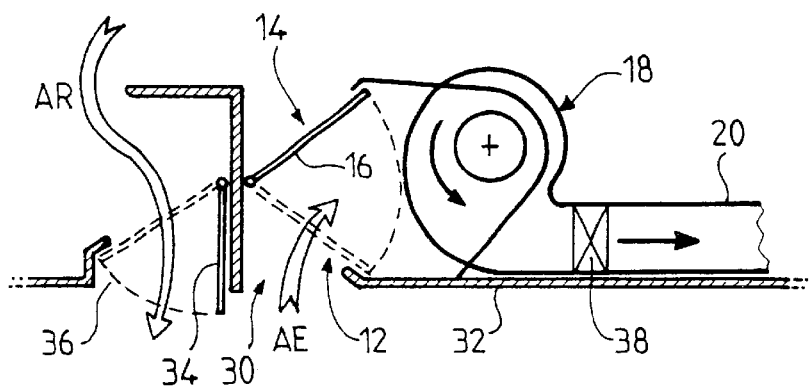
FIG. 2 is a view in partial section, on an enlarged scale, of a device of the invention according to a variant embodiment.

Referring now to FIG. 2, a variant embodiment of the air-inlet chamber is shown, in which the same elements as in FIG. 1 are again found, the chamber here being represented in "outside air" position. The air inlet 12 is open, while the air inlet 14 is closed, so that the blower 10 is fed with a flow of outside air AE taken up from outside the passenger compartment. This airflow then circulates as described above. The airflow is then discharged via the extractor 34 which is in open position. It will be noted, however, that the configuration of the extractor 34 is somewhat different from that of FIG. 1.

Figure 3:
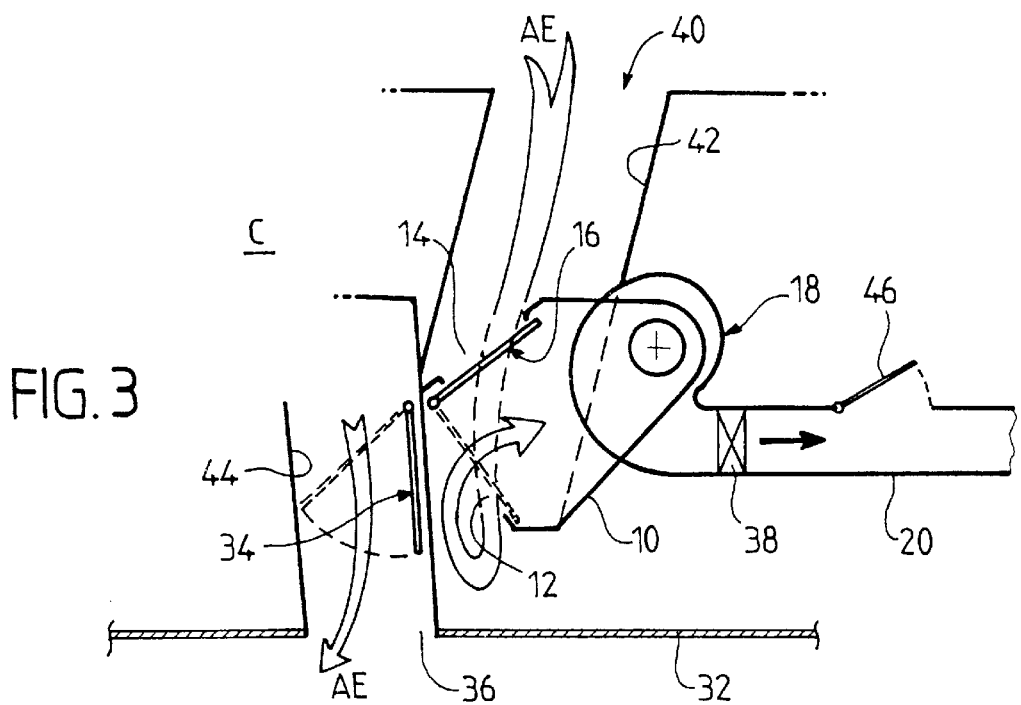
FIG. 3 is a sectional view of a device according to a second embodiment of the invention.

Referring now to FIG. 3, another embodiment of the invention is shown, the device being represented in "outside air" position.

In this embodiment, the inlet 12 for the outside air AE communicates with an air intake 40 opening out outside the passenger compartment, but at the upper part, unlike the intake 30 described above which was formed through the floor.

The air intake 40 opens out in the region of the trunk or of the tailgate of the vehicle and it is linked to the air inlet 12 by a substantially vertical duct 42. The inlet 14 for the recirculated air is arranged in the same way as in FIGS. 1 and 2 and opens out into the luggage compartment C.

Furthermore, the extractor 34 exhibits a shape similar to that of FIG. 2, except that it is housed in a duct 44 which, on the one hand, opens out into the luggage compartment C and, on the other hand, terminates at the air intake 36 formed through the floor 32.

As shown in FIG. 3, it is also possible to provide a shutter 46 mounted on the connecting duct 20 of the electric radiator 38 and in the region of the rear part of the passenger compartment. When the shutter is open, it makes it possible to direct the pre-heated airflow originating from the radiator 38 directly towards the rear passengers.

It should be noted that, in another variant embodiment (not represented), it is possible to dispense with the vent 28 directed towards the passengers' feet and thus also to dispense with the corresponding operating mode.

The fact of shifting the blower rearwards makes it possible to suppress the vibration transmitted into the front part of the passenger compartment and particularly to the steering wheel. This arrangement also facilitates the recirculation of the air between the front part and the rear part of the passenger compartment. This results in simplified management of the odors in the passenger compartment given that, in the event of overpressure, there is no return of odors through the extractor.

In general, an improvement in the air-supply comfort results, the management of the extraction of the air in the passenger compartment into the luggage compartment occurring at chosen places, for example in the rear sill, at the foot of the rear seats, through judiciously placed apertures. Moreover, it is thus possible to cause an airflow to pass between the driver and the passenger without adding central air vents, which allows the constructor to install instrumentation in their place.

Obviously, the invention is not limited to the embodiment described above by way of example and extends to other variants. Whereas the invention has been described by reference to a device with a single blower, it is possible to provide two blowers assigned respectively to the right and left sides of the passenger compartment.

What we claim is:

1. A device for heating and/or air conditioning a motor-vehicle passenger compartment, comprising an air-inlet chamber suitable for being fed with outside air or with recirculated air, a blower linked to the air-inlet chamber for producing a blown airflow, treatment and distribution means fed by the blower for producing a treated airflow and distributing it among various vents opening out into the passenger compartment, wherein the air-inlet chamber and the blower are adapted for being installed in a rear part of the vehicle, while the treatment and distribution means are adapted for being installed in a front part of the passenger compartment and wherein a connecting duct is provided for connecting the blower to the treatment and distribution means.

2. The device of claim 1, wherein the air-inlet chamber has an inlet for outside air which communicates with the outside of the passenger compartment, with an inlet for recirculated air, said inlet communicating with the interior of the passenger compartment and having at least one flap adapted for being brought selectively either into a position called "outside air" in which the air-inlet chamber is supplied with outside air, or into a position called "recirculated air", in which the air-inlet chamber is fed with recirculated air, or into an intermediate position.

3. The device of claim 2, wherein the said inlet for outside air communicates with an air intake opening out to the outside of the passenger compartment.

4. The device of claim 2, wherein the rear part of the vehicle is separated from the passenger compartment by a partition fitted with air-passage apertures, and the inlet for the recirculated air communicates with the said rear part of the vehicle.

5. The device of claim 1, wherein the air-inlet chamber and the blower are adapted to be installed in the region of the rear luggage compartment of the vehicle.

6. The device of claim 1, wherein the air-inlet chamber further comprises an air extractor adapted to be either open in the "outside air" position, or closed in the "recirculated air" position.

7. The device of claim 1, wherein the treatment and distribution means are adapted for installation in the region of the dashboard of the vehicle.

8. The device of claim 1, wherein the treatment and distribution means comprise means for heating and/or cooling the airflow supplied by the blower.

9. The device of claim 1 and further comprising an additional electric-heating radiator installed at the outlet from the blower or in the connecting duct for pre-heating the air sent to the treatment and distribution means.

10. The device of claim 9, wherein the additional electric-heating radiator comprises at least one electrical resistance element with a positive temperature coefficient.

* * * * *